(12) United States Patent
Hess et al.

(10) Patent No.: US 12,664,549 B2
(45) Date of Patent: Jun. 23, 2026

(54) HYBRID TRANSACTION OPERATIONS

(71) Applicant: Truist Bank, Charlotte, NC (US)

(72) Inventors: Stephen Gary Hess, Palm Springs, CA (US); Nancy Wells, Kenosha, WI (US); Yadhira Haydee Arroyo, Chicago, IL (US)

(73) Assignee: Truist Bank, Charlotte, NC (US)

( * ) Notice: Subject to any disclaimer, the term of this patent is extended or adjusted under 35 U.S.C. 154(b) by 251 days.

(21) Appl. No.: 17/894,769

(22) Filed: Aug. 24, 2022

(65) Prior Publication Data

US 2024/0070670 A1 Feb. 29, 2024

(51) Int. Cl.
| | |
|---|---|
| *G06Q 20/40* | (2012.01) |
| *G06F 3/01* | (2006.01) |
| *G06Q 20/10* | (2012.01) |
| *G06Q 20/32* | (2012.01) |
| *G06Q 20/38* | (2012.01) |

(52) U.S. Cl.
CPC ....... *G06Q 20/40145* (2013.01); *G06F 3/017* (2013.01); *G06Q 20/108* (2013.01); *G06Q 20/3278* (2013.01); *G06Q 20/3825* (2013.01); *G06Q 20/389* (2013.01); *G06Q 20/40155* (2020.05)

(58) Field of Classification Search
None
See application file for complete search history.

(56) References Cited

U.S. PATENT DOCUMENTS

| | | | | |
|---|---|---|---|---|
| 11,348,076 | B1 * | 5/2022 | Goetz ................... | G07F 17/105 |
| 2009/0037306 | A1 * | 2/2009 | Hill ........................ | G06Q 40/00 |
| | | | | 705/35 |
| 2013/0238497 | A1 * | 9/2013 | Ramachandran .... | G06Q 20/385 |
| | | | | 705/41 |
| 2016/0086181 | A1 * | 3/2016 | Candelore ........... | G06Q 20/341 |
| | | | | 705/16 |
| 2016/0275760 | A1 * | 9/2016 | Block ................... | G07F 19/203 |
| 2016/0321627 | A1 * | 11/2016 | McCracken ....... | G06Q 20/1085 |
| 2017/0308883 | A1 * | 10/2017 | Black ................. | G06Q 20/3278 |

* cited by examiner

*Primary Examiner* — Patrick Mcatee
*Assistant Examiner* — Jason B Fenstermacher
(74) *Attorney, Agent, or Firm* — Kilpatrick Townsend & Stockton LLP; Michael A. Springs, Esq.

(57) ABSTRACT

Techniques for hybrid banking can be provided for a user. For example, a system described herein can include a processor and a memory that includes instructions executable by the processor to perform operations. The operations can include receiving a request to perform a hybrid transaction from a user through at least one portable device associated with the user. The operations can also include initiating performance of the hybrid transaction based on the request and accessing information associated with the user and the hybrid transaction. The operations can further include confirming an identity of the user based on the request received from the user through the at least one portable device and the information associated with the user and the hybrid transaction. Additionally, the operations can include completing the hybrid transaction.

18 Claims, 3 Drawing Sheets

HYBRID TRANSACTION OPERATIONS

TECHNICAL FIELD

The present disclosure relates generally to transaction operations and, more particularly (although not necessarily exclusively), to hybrid transaction operations.

BACKGROUND

Historically, a travel to a physical location was necessary to accomplish various transactions. For example, users would travel to a brick and mortar stores and speak or otherwise interact with customer service representatives to accomplish the transactions. In some examples, the physical locations involve waiting in lines for a long period of time to meet with the customer service representatives. Customers can prefer the opportunity to have numerous options in terms of how the customers interact with the server operator of their choice.

SUMMARY

Techniques for hybrid banking can be provided for a user. For example, a system described herein can include a processor and a memory that includes instructions executable by the processor to perform operations. The operations can include receiving a request to perform a hybrid transaction from a user through at least one portable device associated with the user. The operations can also include initiating performance of the hybrid transaction based on the request and accessing information associated with the user and the hybrid transaction. The operations can further include confirming an identity of the user based on the request received from the user through the at least one portable device and the information associated with the user and the hybrid transaction. Additionally, the operations can include completing the hybrid transaction.

In another example, a computer-implemented method described herein can include receiving a request to perform a hybrid transaction from a user through at least one portable device associated with the user. The method can also include initiating performance of the hybrid transaction based on the request and accessing information associated with the user and the hybrid transaction. The method can further include confirming an identity of the user based on the request received from the user through the at least one portable device and the information associated with the user and the hybrid transaction. Additionally, the method can include completing the hybrid transaction.

In another example, a non-transitory computer-readable medium includes instructions that are executable by a processor for causing the processor to perform operations including receiving a request to perform a hybrid transaction from a user through at least one portable device associated with the user. The operations can also include initiating performance of the hybrid transaction based on the request and accessing information associated with the user and the hybrid transaction. The operations can further include confirming an identity of the user based on the request received from the user through the at least one portable device and the information associated with the user and the hybrid transaction. Additionally, the operations can include completing the hybrid transaction.

DETAILED DESCRIPTION

Certain aspects and examples of the present disclosure relate to providing multiple techniques for hybrid transactions. Hybrid transactions can include a union of digital and in-house transaction services that create a customer-centric transaction experience that can allow users to access transaction services in any method they choose. Users can prefer to use portable devices for transaction experiences instead of interacting with customer service representative at a brick and mortar store. In some examples, users can enjoy a face-to-face experience with a customer service representative provided they can avoid waiting in a long line.

For example, the user can initiate a hybrid transaction by first submitting a request through a portable device. In some examples, the request can be a gesture such as tapping a passcode on a smartwatch, which can serve as the portable device. The portable device can transmit the request to a computing device associated with a server operator and the hybrid transaction can commence. The hybrid transaction can be completed either at the brick and mortar store or, after confirmation of an identity of the user, remotely. Since the hybrid transaction can be initiated prior to arrival, the user may avoid spending time in line when they arrive at the brick and mortar store. Confirmation of the identity can include detecting a voice signature of the user from a voice command. Confirmation of the identity can include an e-signature of the user 112 received by the portable device. Other identity confirmations may also be implemented.

In some examples, techniques of hybrid transactions can provide accommodation to some users. For example, the user can forget or misplace their debit card often. The user can be provided with a near-field communication (NFC) enabled token as a replacement for the debit card. NFC technology can allow multiple devices to communicate wirelessly when near each other. The NFC enabled token can be used at any automated teller machine (ATM) and can sometimes be used at participating third party server operators. The user may no longer need to worry about losing their debit card. The NFC token can be so small that the token can be attached to many types of items including wearable items like jewelry. Physical NFC tokens representing the same account can also be provided to multiple users, such as relatives of the user, upon request.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
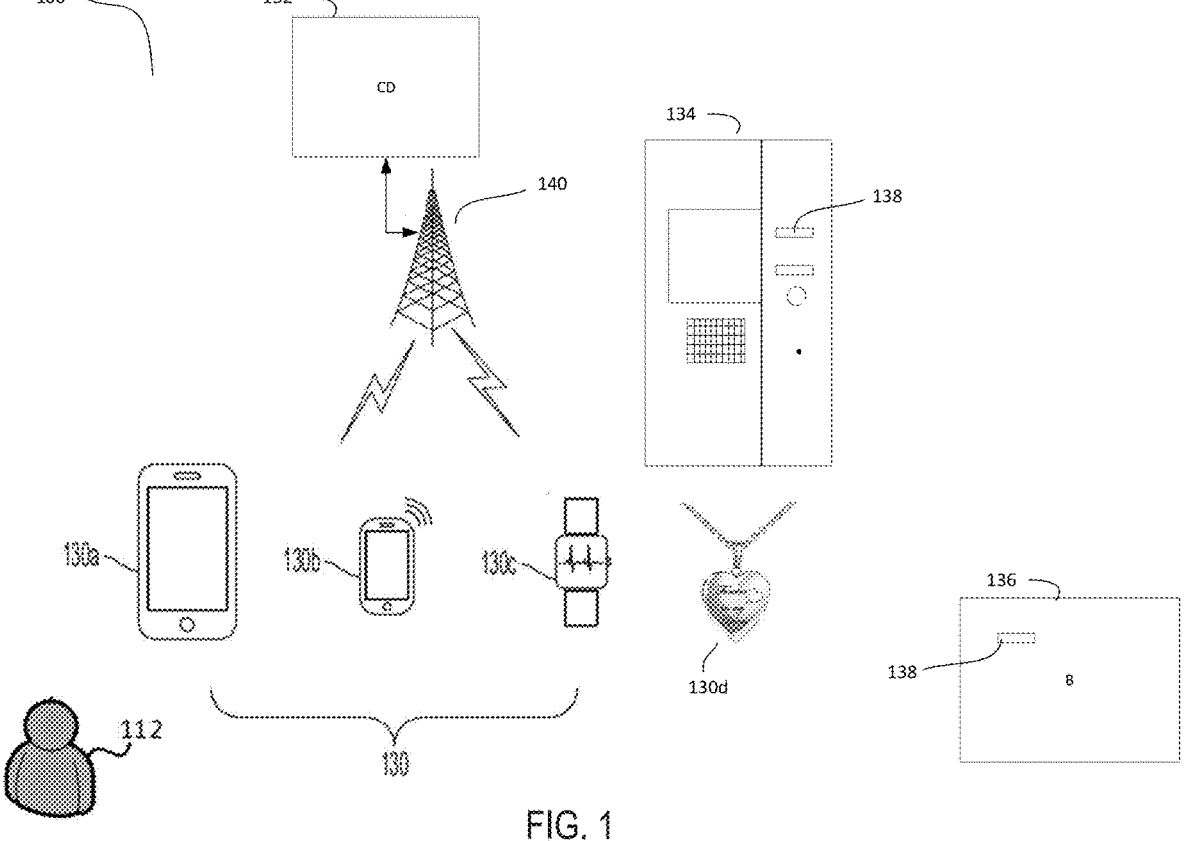
FIG. 1 is a schematic of a hybrid transaction environment according to one example of the present disclosure.

FIG. 1 is a schematic of a hybrid transaction environment 100 according to one example of the present disclosure. Included in the hybrid transaction environment 100 are the user 112, one or more portable devices 130, one or more communication networks 140, an ATM 134, and a computing device 132. The hybrid transaction environment 100 can also include a bank 136. Both the bank 136 and the ATM 134 can include an NFC reader 138. The one or more portable devices 130 and the ATM 134 may send or receive communication with the computing device 132 over the one or more communication networks 140. The one or more communication networks 140 may correspond to one or more Wide Area Networks ("WANs"), such as the Internet, through which the one or more portable devices 130, the ATM 134, and the computing device 132 may communicate with servers via web browsers or client-side applications, to establish communication sessions, request and receive web-based resources, and access other features of applications or services. Although illustrated separate from the ATM 134 in the hybrid transaction environment 100, in certain examples, the computing device 132 can be included within the ATM 134 and in other examples, the computing device 132 can be situated in a remote location away from the hybrid transaction environment 100.

The one or more portable devices 130, which can include suitable portable devices for accessing web-based resources or application-based resources, can be capable of accessing and establishing communication sessions with the computing device 132 through the one or more communication networks 140. As illustrated in FIG. 1, portable devices 130*a*-130*c* correspond to mobile devices, including tablet computers 130*a*, smartphones 130*b*, and smart watches 130*c*, which may access the computing device 132 via a Local Area Network ("LAN") or Wide Area Network ("WAN"), as well as mobile telecommunication networks, short-range wireless networks, or various other communication network types (e.g., cable or satellite networks). Portable device 130*d* corresponds to an NFC token. The NFC token can be added to any item, such as a locket or other piece of jewelry, and can turn any item into an equivalent of a debit card. The NFC token can be capable of interacting with one or more other portable devices to contribute to a hybrid transaction. For example, the NFC token can be used to confirm an identity or to confirm authorization by the user 112 for another person to perform the transaction on behalf of the user 112. In certain examples, the NFC token can be attached to a mobile device which may access the computing device 132 directly as described above.

In an example, the portable device 130*d* equipped with the NFC token can be passively detected by another portable device 130 from which a hybrid transaction is initiated. The passive detection may be a mechanism for the portable device 130 to authenticate that the user 112 is authorized to perform the hybrid transaction at the portable device 130. In an additional example, the portable device 130*d* equipped with the NFC token may be passively detected upon entry of the user 112 at the bank 136 when the user 112 is completing the hybrid transaction. In such an example, the computing device 132 may alert a teller or other customer service representative of the bank 136 that the user 112 has arrived presumably to complete the hybrid transaction. By alerting the teller or other customer service representative of the arrival of the user 112, the in-person portion of the hybrid transaction may be completed with greater efficiency by the bank 134.

The one or more portable devices 130 can transmit a request from the user 112 to the computing device 132. The computing device 132 can begin a hybrid transaction based on the request from the user 112. As an example, the user 112 can intend to purchase a vehicle, which may require a cashier's check to make a down payment. The user can tap a passcode into their portable device, which in this case is a smartwatch, and speak a voice command into the smartwatch, "$3000 cashier's check-pick up in one hour." After the predetermined time, which in this case is one hour, the computing device 132 can detect the smartwatch and the user 112 in a bank lobby, confirm the identity of the user 112 through a voice signature of a voice command, and the user 112 can leave with the cashier's check without having to wait in line. Confirming the identity of the user can include an e-signature of the user 112 received by the one or more portable devices 130. Additionally, the user 112 may present the portable device 130*d* at the NFC reader 138 of the bank 136 or the ATM 134.

In an additional example, the user 112 can enter a request for a particular amount of money for an account withdrawal in particular denominations that may not always be available at the bank 136 or the ATM 134. For example, the user 112 may enter a request through one or more portable devices 130 for $1000 in two-dollar bill denominations, or the user 112 may enter a request for $1000 worth of a particular foreign currency. The bank 136 may provide an indication to the user 112 of when the order will be available for pickup by the user 112. By placing the order remotely through the portable devices 130, the user 112 is able to avoid multiple trips to the bank 136 in an instance where the bank 136 is not immediately able to fill the order. Further, in some examples, the ATM 134 may be able to fill the unique orders provided by the user 112 with the portable devices 130. For example, upon receiving the order at the bank 136, the bank 136 may load a special purpose version of the ATM 134 with the order such that the user 112 is able to retrieve the unique order directly through the ATM 134.

Additionally, the user 112 may enter deposit information at a portable device 130 to avoid lines at the bank 136 or the ATM 134. For example, the user 112 may pre-enter all of the information generally provided to the bank 136 for a deposit prior to arriving at the bank 136 or the ATM 134. Once the user arrives at the bank 136 or the ATM 134, the user 112 may identify themselves (e.g., through a debit card or an NFC token) and complete the deposit transaction.

In another example, the user 112 can have a relative request a banking transaction at an ATM 134 via a portable device 130 associated with the relative. In the example, an NFC enabled token (e.g., a locket) issued to the relative can communicate with the portable device 130 associated with the relative to confirm an identity of the relative as an additional user who is authorized to make hybrid transactions. In some examples, the identity of the user 112 can be confirmed instead of the identity of the relative and the banking transaction can be approved through voice signature of a voice command received by a portable device, which can be a different portable device than the portable device associated with the relative.

Figure 2:
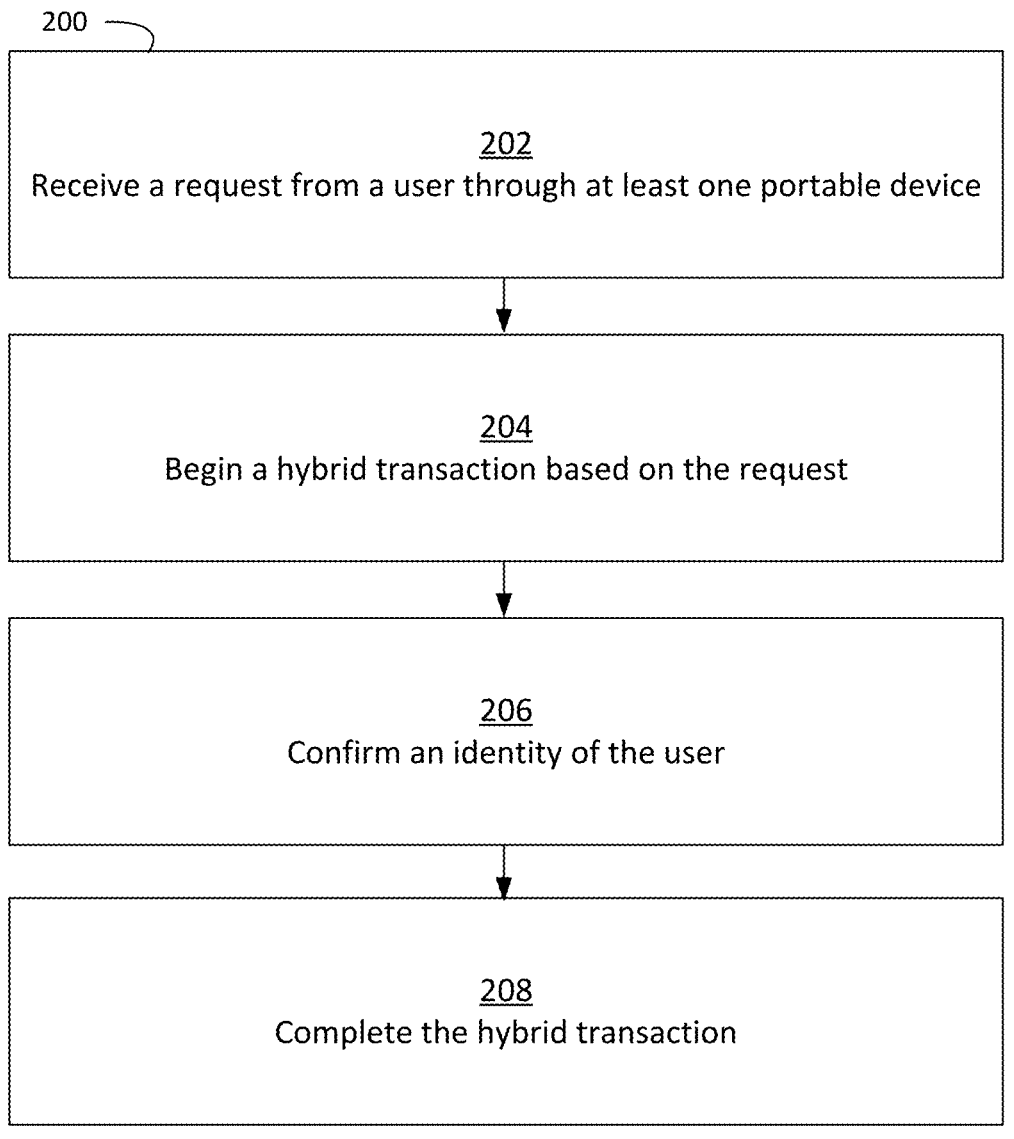
FIG. 2 is a flowchart of a process for providing hybrid transactions according to one example of the present disclosure.

FIG. 2 is a flowchart of a process 200 for providing hybrid transactions according to one example of the present disclosure. Operations of flowcharts may be performed by software, firmware, hardware, or a combination thereof. At block 202, the process 200 involves receiving a request from a user 112 through at least one portable device 130. The at least one portable device can include an NFC enabled token, wearable technology, a smart phone, or a tablet. The wearable technology can include a smartwatch. The NFC enabled token can be added to a variety of items including jewelry like lockets, wallets, wearable items, smart devices, other portable devices, etc.

In some examples, the request can take the form of a gesture. The gesture can include a voice command, a passcode, a facial expression or a motion of an extremity. The gesture can include a specific intent. For example, the user 112 can tap a passcode onto the at least one portable device 130. The intent of the passcode can include accessing the banking account of the user 112 in order to make a transfer of money from a checking account to a savings account. In some examples, the intent of the gesture can be determined by the at least one portable device 130. In other examples, the intent of the gesture can be determined by the computing device 132.

At block 204, the process 200 involves beginning a hybrid transaction based on the request. The hybrid transaction can begin based on information about the user 112, such as an identity of the user and an intent of the gesture. For example, the user 112 could tap a passcode into the at least one portable device 130. The computing device 132 can determine that the intent of the gesture, in this case the passcode, is to access a checking account to transfer money from the user's checking account to the user's savings account. In an example, the passcode can indicate that the user 112 would like to complete a transaction at a specific branch location at a certain time and would like to reduce wait time. In another example, an additional user such as a relative of the user can begin the banking transaction by tapping the passcode on a portable device associated with the additional user. The computing device can begin the banking transaction based on the intent of the passcode.

At block 206, the process 200 involves confirming an identity of the user 112. Before completing a hybrid transaction, confirmation of the identity of the user may confirm that the hybrid transaction is authorized by the user 112. This can be important to avoid cases of theft or identity fraud. In some examples, the user 112 can provide a voice command to the at least one portable device 130. The computing device 132 or the at least one portable device 130 can confirm the identity of the user by verifying a voice signature from the voice command. An NFC enabled token can also confirm the identity of the user, such as through communication with the at least one portable device 130. In some examples, confirming the identity of the user 112 can include confirming the identity of an additional user who is authorized to make transactions.

In some examples, the identity of the user 112 can be confirmed at an ATM using the NFC enabled token. For example, the user 112 may tend to lose a debit card. The NFC enabled token may be issued to the user 112 and added to a lock or small wearable item to address a lost debit card. In some examples, the ATM can confirm the identity of the user 112 from the NFC enabled token with an NFC reader 138.

In some examples, the user 112 does not need to be present at a location that the hybrid transaction is taking place to authorize the hybrid transaction. For example, a grandmother may wish to provide transaction access to her grandchild. The grandchild can submit the request through at least one portable device 130, for example a smart phone that is not recognized by the computing device 132 as being associated with the user 112. In this case, the computing device can transmit a secondary request to the user 112 or to the at least one portable device 130 asking the user 112 to authorize the hybrid transaction. The user 112, which in this case is the grandmother, can confirm the identity and authorize the transaction by speaking a voice command that is received by at least one portable device 130 such as a tablet. The computing device 132 or the at least one portable device 130, which in this case is the tablet, can confirm the identity of the user by verifying a voice signature from the voice command.

At block 208, the process 200 involves completing the hybrid transaction. Once the identity of the user is confirmed, the hybrid transaction can be completed. In examples where the identity is not confirmed, the computing device 132 can ignore the request and will not complete the hybrid transaction. In some examples, proof of completion of the banking transaction will be sent to the user 112. In certain examples, the proof of completion can take the form of a receipt sent by the computing device 132 to the at least one portable device 130.

Figure 3:
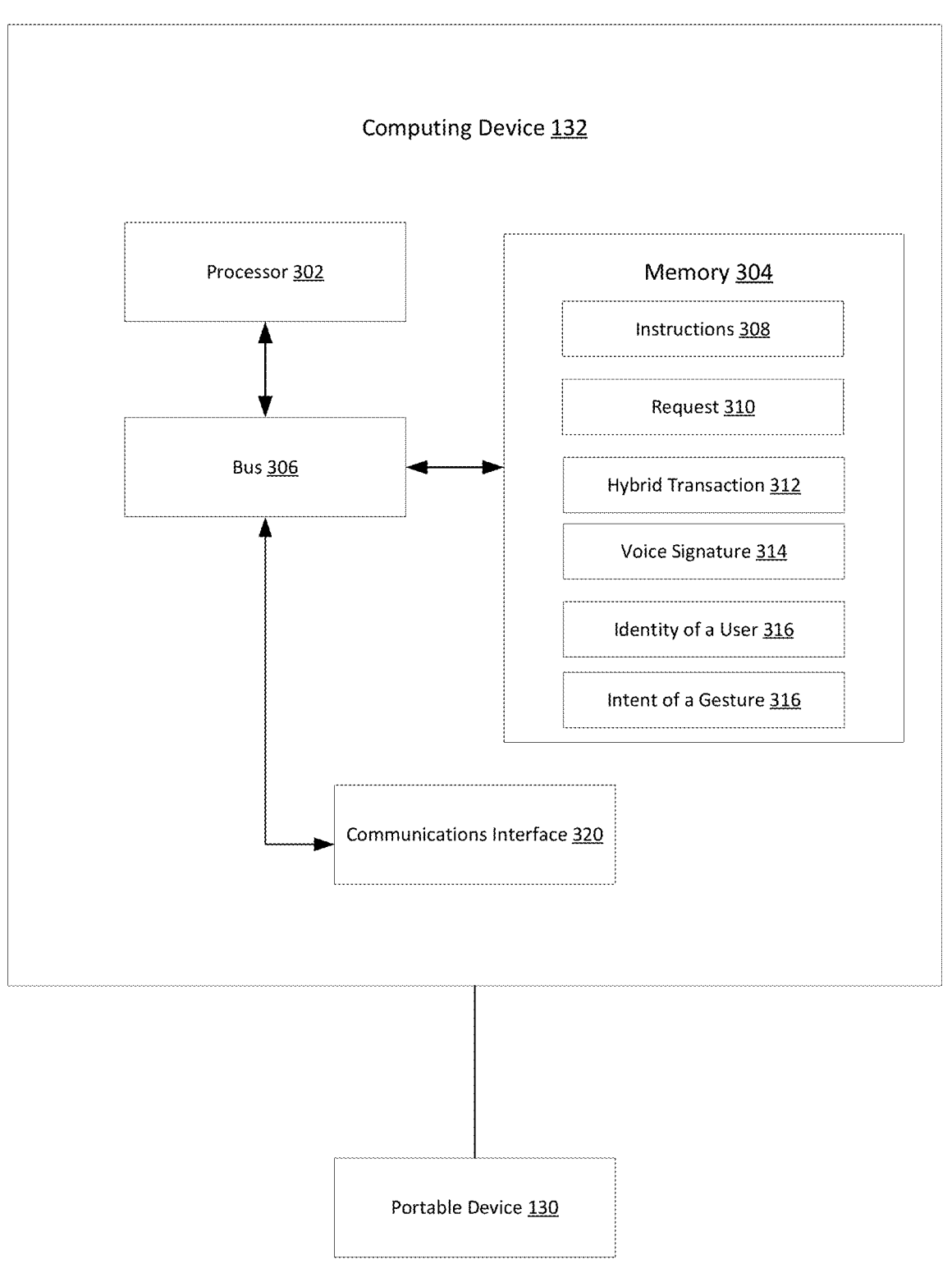
FIG. 3 is a block diagram of an example of a computing device for providing hybrid transactions according to one example of the present disclosure.

FIG. 3 is a block diagram of an example of a computing device 132 for providing hybrid transactions according to one example of the present disclosure. The components in FIG. 3, such as a processor 302, a memory 304, a bus 306, and the like, may be integrated into a single structure such as within a single housing of the computing device 132 or within an ATM 134. Alternatively, the components shown in FIG. 3 can be distributed from one another and in electrical communication with each other.

As shown, the computing device 132 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a micropro-cessor, or any combination of these. The processor 302 can execute instructions 308 stored in the memory 304 to perform operations. In some examples, the instructions 308 stored in the memory 304 can include processor-specific instructions generated by a compiler or an interpreter from code written in any suitable computer-programming language, such as C, C++, C#, or Java.

The memory 304 can include one memory device or multiple memory devices. The memory can be non-volatile and may include any type of memory device that retains stored information when powered off. Non-limiting examples of the memory include electrically erasable and programmable read-only memory (EEPROM), flash memory, or any type of non-volatile memory. At least some of the memory 304 can include a non-transitory computer-readable medium from which the processor 302 can read the instructions 308. The non-transitory computer-readable medium can include electronic, optical, magnetic, or other storage devices capable of providing the processor 302 with the instructions 308 or other program code. Non-limiting examples of the non-transitory computer-readable medium include magnetic disk(s), memory chip(s), RAM, an ASIC, or any other medium from which a computer processor can read instructions.

The computing device 132 also includes the bus 306 (e.g., PCI, ISA, PCI-Express, Hyper-Transport® bus, Infini-Band® bus, NuBus, etc.) and a communications interface 320 (e.g., a Fiber Channel Interface, wireless interface, etc.) Realizations may include fewer or additional components not illustrated in FIG. 3 (e.g., video cards, audio cards, additional communication interfaces, peripheral devices, etc.) The processor 302 and the communication interface 320 are coupled to the bus 306. Although illustrated as being coupled to the bus 306, the memory 304 may be coupled to the processor 302.

Additionally, the memory 304 can include a request module 310, a hybrid transaction module 312, a voice signature module 314, an identity of a user module 316, and an intent of a gesture module 318. The computing device 132 can receive the request 310 the intent of the gesture 318 and the voice signature 314 from one or more portable devices 130 by means of the communications interface. The processor 302 can begin the hybrid transaction based on the request 310 and based on the intent of the gesture 318. The processor 302 can confirm the identity of the user 316 based on the voice signature 314.

In some examples, the computing device 132 can implement the process 200 shown in FIG. 2 for effectuating some aspects of the present disclosure. Other examples can involve more operations, fewer operations, different operations, or a different order of the operations shown in FIG. 2. The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a memory that includes instructions executable by the processor for causing the processor to perform operations comprising:
    receiving a request to perform a first step of a hybrid transaction through at least one portable device associated with a user, the at least one portable device communicatively coupled with a wearable device worn by the user, the wearable device comprising a near-field communication (NFC) token that is separate from and communicatively coupled with the at least one portable device, the request including (i) information associated with a hand gesture and (ii) a voice command comprising details about the hybrid transaction, wherein the request is received from the user at a first time, wherein the hand gesture comprises (i) a movement of an extremity of the user capturable by the portable device and (ii) an intent specific to the movement of the extremity;
    detecting a voice signature of the user and an indication of a second time from the voice command;
    accessing information associated with the user and the hybrid transaction, wherein the operation of accessing the information associated with the user and the hybrid transaction comprises accessing the information associated with the user and the hybrid transaction based on the intent of the hand gesture;
    determining an identity of the user based on the information associated with the hand gesture and the information associated with the user and the hybrid transaction;
    detecting, via the NFC token, the user at a bank lobby at the second time that is after the first time;
    authenticating the identity of the user based on detecting the user at the bank lobby at the second time, wherein authenticating the identity of the user comprises:
        determining that the NFC token and the at least one portable device are associated with the user based at least in part on detecting the NFC token or the at least one portable device at the bank lobby;
        receiving a second voice signature at the bank lobby; and
        determining that the second voice signature matches the voice signature; and
    automatically initiating, in response to authenticating the identity of the user, a second step of a multi-step process to complete the hybrid transaction.

2. The system of claim 1, wherein the at least one portable device comprises an NFC token, wearable technology, a smart phone, or a tablet.

3. The system of claim 2, wherein the operations further comprise:
    sending a secondary request to the at least one portable device requesting that the user to authorize the hybrid transaction.

4. The system of claim 1, wherein the operation of determining the identity of the user further comprises confirming the identity through a voice signature of a voice command received by the at least one portable device or through an e-signature received by the at least one portable device.

5. The system of claim 1, wherein the request to perform the hybrid transaction comprises a gesture from the user detected by the at least one portable device.

6. The system of claim 5, wherein the gesture comprises at least one of: a voice command, a passcode, a facial expression, and a motion of an extremity.

7. A computer-implemented method, comprising:
    receiving a request to perform a first step of a hybrid transaction through at least one portable device associated with a user, the at least one portable device communicatively coupled with a wearable device worn by the user, the wearable device comprising a near-field communication (NFC) token that is separate from and communicatively coupled with the at least one portable device, the request including (i) information associated with a hand gesture and (ii) a voice command comprising details about the hybrid transaction, wherein the request is received from the user at a first time, wherein the hand gesture comprises (i) a movement of an extremity of the user capturable by the portable device and (ii) an intent specific to the movement of the extremity;
    detecting a voice signature of the user and an indication of a second time from the voice command;
    accessing information associated with the user and the hybrid transaction, wherein accessing the information associated with the user and the hybrid transaction comprises accessing the information associated with the user and the hybrid transaction based on the intent of the hand gesture;
    determining an identity of the user based on the information associated with the hand gesture and the information associated with the user and the hybrid transaction;
    detecting, via the NFC token, the user at a bank lobby at the second time that is after the first time;
    authenticating the identity of the user based on detecting the user at the bank lobby at the second time, wherein authenticating the identity of the user comprises:
        determining that the NFC token and the at least one portable device are associated with the user based at least in part on detecting the NFC token or the at least one portable device at the bank lobby;
        receiving a second voice signature at the bank lobby; and
        determining that the second voice signature matches the voice signature; and
    automatically initiating, in response to authenticating the identity of the user, a second step of a multi-step process to complete the hybrid transaction.

8. The computer-implemented method of claim 7, wherein the at least one portable device comprises an NFC token, wearable technology, a smart phone, or a tablet.

9. The computer-implemented method of claim 7, further comprising:

sending a secondary request to the at least one portable device requesting that the user to authorize the hybrid transaction.

10. The computer-implemented method of claim 7, wherein determining the identity of the user further comprises confirming the identity through a voice signature of a voice command received by the at least one portable device or through an e-signature received by the at least one portable device.

11. The computer-implemented method of claim 7, wherein the request to perform the hybrid transaction comprises a gesture from the user detected by the at least one portable device.

12. The computer-implemented method of claim 11, where the gesture comprises at least one of: a voice command, a passcode, a facial expression, and a motion of an extremity.

13. A non-transitory computer-readable medium comprising instructions that are executable by a processor for causing the processor to perform operations comprising:

receiving a request to perform a first step of a hybrid transaction through at least one portable device associated with a user, the at least one portable device communicatively coupled with a wearable device worn by the user, the wearable device comprising a near-field communication (NFC) token that is separate from and communicatively coupled with the at least one portable device, the request including (i) information associated with a hand gesture and (ii) a voice command comprising details about the hybrid transaction, wherein the request is received from the user at a first time, wherein the hand gesture comprises (i) a movement of an extremity of the user capturable by the portable device and (ii) an intent specific to the movement of the extremity;

detecting a voice signature of the user and an indication of a second time from the voice command;

accessing information associated with the user and the hybrid transaction, wherein the operation of accessing the information associated with the user and the hybrid transaction comprises accessing the information associated with the user and the hybrid transaction based on the intent of the hand gesture;

determining an identity of the user based on the information associated with the hand gesture and the information associated with the user and the hybrid transaction;

detecting, via the NFC token, the user at a bank lobby at the second time that is after the first time;

authenticating the identity of the user based on detecting the user at the bank lobby at the second time, wherein authenticating the identity of the user comprises:

determining that the NFC token and the at least one portable device are associated with the user based at least in part on detecting the NFC token or the at least one portable device at the bank lobby;

receiving a second voice signature at the bank lobby; and determining that the second voice signature matches the voice signature; and automatically initiating, in response to authenticating the identity of the user, a second step of a multi-step process to complete the hybrid transaction.

14. The non-transitory computer-readable medium of claim 13, wherein the at least one portable device comprises an NFC token, wearable technology, a smart phone, or a tablet.

15. The non-transitory computer-readable medium of claim 13, wherein the operations further comprise:

sending a secondary request to the at least one portable device requesting that the user to authorize the hybrid transaction.

16. The non-transitory computer-readable medium of claim 13, wherein the operation of determining the identity of the user further comprises confirming the identity through a voice signature of a voice command received by the at least one portable device or through an e-signature received by the at least one portable device.

17. The non-transitory computer-readable medium of claim 13, wherein the request to perform the hybrid transaction comprises a gesture from the user detected by the at least one portable device.

18. The non-transitory computer-readable medium of claim 17, where the gesture comprises at least one of: a voice command, a passcode, a facial expression, and a motion of an extremity.

* * * * *